United States Patent
Torpey et al.

(10) Patent No.: US 7,258,410 B2
(45) Date of Patent: Aug. 21, 2007

(54) METHOD AND APPARATUS FOR REDUCING INTERCOLOR BLEED TO IMPROVE PRINT QUALITY

(75) Inventors: Peter A. Torpey, Webster, NY (US); Gary A. Kneezel, Webster, NY (US)

(73) Assignee: Xerox Corporation, Stamford, CT (US)

( * ) Notice: Subject to any disclaimer, the term of this patent is extended or adjusted under 35 U.S.C. 154(b) by 123 days.

(21) Appl. No.: 10/985,253

(22) Filed: Nov. 10, 2004

(65) Prior Publication Data

US 2006/0098037 A1 May 11, 2006

(51) Int. Cl.
*B41J 29/38* (2006.01)
*B41J 2/205* (2006.01)
*B41J 2/15* (2006.01)
*B41J 2/21* (2006.01)

(52) U.S. Cl. .............. 347/14; 347/15; 347/41; 347/43

(58) Field of Classification Search .......... 347/41, 347/43, 15
See application file for complete search history.

(56) References Cited

U.S. PATENT DOCUMENTS

| | | | |
|---|---|---|---|
| 4,463,359 A | 7/1984 | Ayata et al. | |
| 4,571,599 A | 2/1986 | Rezanka | |
| RE32,572 E | 1/1988 | Hawkins et al. | |
| 5,142,296 A | 8/1992 | Lopez et al. | |
| 5,300,968 A | 4/1994 | Hawkins | |
| 5,412,410 A | 5/1995 | Rezanka | |
| 5,568,169 A | 10/1996 | Dudek et al. | |
| 5,594,478 A | 1/1997 | Matsubara et al. | |
| 5,717,448 A * | 2/1998 | Inada | 347/43 |
| 5,739,833 A | 4/1998 | Yamazaki et al. | |
| 5,745,131 A | 4/1998 | Kneezel et al. | |
| 5,801,727 A | 9/1998 | Torpey | |
| 5,933,166 A | 8/1999 | Andrews et al. | |
| 6,137,502 A | 10/2000 | Anderson et al. | |
| 6,161,919 A | 12/2000 | Klassen | |
| 6,183,062 B1 | 2/2001 | Curtis et al. | |
| 6,270,186 B1 | 8/2001 | Smith et al. | |
| 6,290,330 B1 | 9/2001 | Torpey et al. | |
| 6,328,399 B1 | 12/2001 | Wen | |
| 6,343,847 B1 | 2/2002 | Torpey et al. | |
| 6,361,144 B1 | 3/2002 | Torpey et al. | |
| 6,375,294 B1 | 4/2002 | Kneezel | |
| 6,402,280 B2 | 6/2002 | Kneezel et al. | |
| 6,406,115 B2 | 6/2002 | Mantell et al. | |
| 6,488,351 B1 | 12/2002 | Newkirk et al. | |
| 6,592,203 B1 | 7/2003 | Bates et al. | |
| 2002/0001004 A1 | 1/2002 | Mantell et al. | |
| 2002/0089577 A1 | 7/2002 | Dietl et al. | |
| 2002/0163557 A1 | 11/2002 | Du et al. | |
| 2003/0081023 A1 | 5/2003 | Miller et al. | |
| 2003/0146957 A1 | 8/2003 | Jeanmaire | |
| 2004/0032598 A1 | 2/2004 | Fagan | |
| 2004/0032620 A1 | 2/2004 | Tanaka et al. | |

* cited by examiner

*Primary Examiner*—Matthew Luu
*Assistant Examiner*—Lisa M. Solomon
(74) *Attorney, Agent, or Firm*—Fay Sharpe LLP (57) ABSTRACT

A method and apparatus for reducing intercolor bleed to improve print quality is provided. This technique includes the detection of an edge between a black portion color portion of an image to be printed, the edge being disposed in a region of color pixels and black pixels to be printed in a first configuration of drops, modifying the first configuration of drops to obtain a second configuration of drops, and printing the image by ejecting the drops from a printhead based on the second configuration.

16 Claims, 7 Drawing Sheets

METHOD AND APPARATUS FOR REDUCING INTERCOLOR BLEED TO IMPROVE PRINT QUALITY

RELATED APPLICATION

This application is related to U.S. application Ser. No. 11/033,369, filed Jan. 10, 2005, entitled "Method and Apparatus Using Pixel Spot Size Control for Reducing Intercolor Bleed," naming Kneezel et al. as inventors.

BACKGROUND

The presently described embodiments relate to a method and apparatus for reducing intercolor bleed to improve print quality. It finds particular application in addressing intercolor bleed problems and will be described with particular reference thereto. However, it is to be appreciated that the present exemplary embodiment is also amenable to other like applications.

For color ink jet printers which print on plain paper, one of the challenges is to achieve a proper balance in ink properties which allows penetration into the paper at a sufficiently rapid rate so that pools of different colored inks in adjacent areas do not appreciably intermix. This phenomenon of intermixing is often referred to as intercolor bleed. However, this penetration of ink should not occur so rapidly so as to allow edge sharpness to be dominated by a random pattern of paper fibers. Typically, it is preferable to formulate the cyan, magenta, and yellow inks using penetrants or surfactants as constituents to enable penetration into the paper within less than a second, i.e., so that ink at the surface is no longer substantially mobile. For sharp black text and high optical density in black printing, however, it is preferable to formulate the black ink so that it less rapidly penetrates (e.g., penetrates in seconds to tens of seconds). This is called medium dry black ink.

Intercolor bleed is most noticeable for images which contain sharply defined borders between two patches of ink of different colors. Such patterns frequently occur in business graphics, for example. When intercolor bleed occurs, instead of the desired sharply defined border, the border appears ragged and fuzzy.

Typically, the target diameter of each spot in an ink jet print is approximately the square root of two times the pixel spacing for the case where all drop ejectors for a given color print nominally the same sized spot. This is to ensure overlap of diagonally adjacent spots. One implication is that at a color boundary, the adjacent different colored pixels will overlap to some extent. Some amount of mixing and intercolor bleed is thus inevitable, unless special measures such as pixel or drop deletion are taken.

Countermeasures against intercolor bleed include techniques for altering the image by deleting pixels or printed drops at the borders between colors. This gives the two adjacent patches a relief zone so that wet pools are less likely to come into contact and intermix.

In this regard, several patents teach various pixel modification algorithms to minimize intercolor bleed. For example, U.S. Pat. No. 6,361,144 to Torpey et al. relates to a method for processing color image data to reduce intercolor bleeding in an image printed on a receiving medium. U.S. Pat. No. 6,290,330 to Torpey et al. relates to a method of processing color image data for printing in an ink jet printer to maintain edge quality in an image recorded on a receiving medium. U.S. Pat. No. 6,183,062 to Curtis et al. provides a method for processing color image data to maintain edge quality in an image recorded on a receiving medium. In addition, U.S. Pat. No. 6,343,847 to Torpey et al. relates to a method for processing color image data to determine if a target pixel is within a border region near an interface. All of these patents are incorporated herein by reference.

However, printing algorithms which perform pixel or drop deletion may produce undesirable printing artifacts on certain types of images, such as pictorial images. It has been demonstrated that pixel management algorithms work significantly better for spot sizes corresponding to printing resolutions of 400 spi and above.

In addition, printing using printheads having different sized nozzles is known. For example, U.S. Pat. No. 5,745,131, entitled "Gray Scale Ink Jet Printer" by G. Kneezel, W. Burger, S. Harrington, D. Ims, and J. Stephany, which is incorporated herein by reference, describes a pattern of laying down dots for gray scale in which a first array of ejectors deposits ink spots of a first size on a first grid pattern, and a second array of ejectors deposits ink spots of a second size on a second grid pattern which is offset from the first grid pattern. The two arrays are also fired in time such that placement of the different sized spots is also offset in the scan direction.

Other embodiments of this type of printhead are described in U.S. Pat. No. 6,402,280, entitled "Printhead with Close-Packed configuration of Alternating Sized Drop Ejectors" by G. Kneezel, D. Mantell, J. O'Neill, T. Tellier and S. Harrington and U.S. Pat. No. 6,375,294, entitled "Gray Scale Fluid Ejection System With Offset Grid Patterns of Different Size Spots" by G. Kneezel, both of which are incorporated herein by reference.

These techniques of printing different drop sizes (and others), however, do not directly address the problem of intercolor bleed in a border or edge region of a printed image.

BRIEF DESCRIPTION

In accordance with one aspect of the presently described embodiments, the method comprises detecting an edge between a black portion and a color portion of an image to be printed, the edge being disposed within a region of color pixels and black pixels to be printed in a first configuration of drops, modifying the first configuration of drops to be printed within the region to obtain a second configuration of drops to be printed within the region wherein the second configuration of drops to be printed includes relatively large drops and relatively small drops, and printing the image by ejecting the drops from a printhead system based on the second configuration, the printhead system having nozzles operative to eject the drops, the nozzles being of sizes corresponding to the relatively large drops and the relatively small drops.

In accordance with another aspect of the presently described embodiments, the modifying comprises removing selected drops to be printed.

In accordance, with another aspect of the presently described embodiments, the selected drops are selected relatively large drops.

In accordance with another aspect of the presently described embodiments, the modifying comprises increasing a frequency of other selected drops to be printed in the region.

In accordance with another aspect of the presently described embodiments, the other selected drops are relatively small drops.

In accordance with another aspect of the presently described embodiments, the modifying is based on a predetermined pattern.

In accordance with another aspect of the presently described embodiments, the modifying is based on at least one of a number of pixels in the region, drop size, print quality, print speed, paper quality and drop location.

In accordance with another aspect of the presently described embodiments, the apparatus comprises means for accomplishing the above methods.

In accordance with another aspect of the presently described embodiments, a system comprises a controller operative to detect an edge between a black portion and a color portion of an image to be printed, the edge being disposed within a region of color pixels and black pixels to be printed in a first configuration of drops and to modify the first configuration of drops to be printed within the region to obtain a second configuration of drops to be printed within the region wherein the second configuration of drops to be printed include relatively large drops and relatively small drops, and, at least one printhead having nozzles operative to eject the drops, the nozzles being of sizes corresponding to the relatively large drops and the relatively small drops.

An advantage of the presently described embodiments is the use of pixel management algorithms for reducing inter-color bleed in a small spot or drop regime (e.g., 400 spi and above).

Another advantage of the presently described embodiments is that printing can be accomplished with larger drop volume, including better heat management through better overall thermal efficiency and the ability to carry off more heat in the ejected ink.

Another advantage of the presently described embodiments is faster printing throughput for a given jetting frequency.

DETAILED DESCRIPTION

Figure 1:
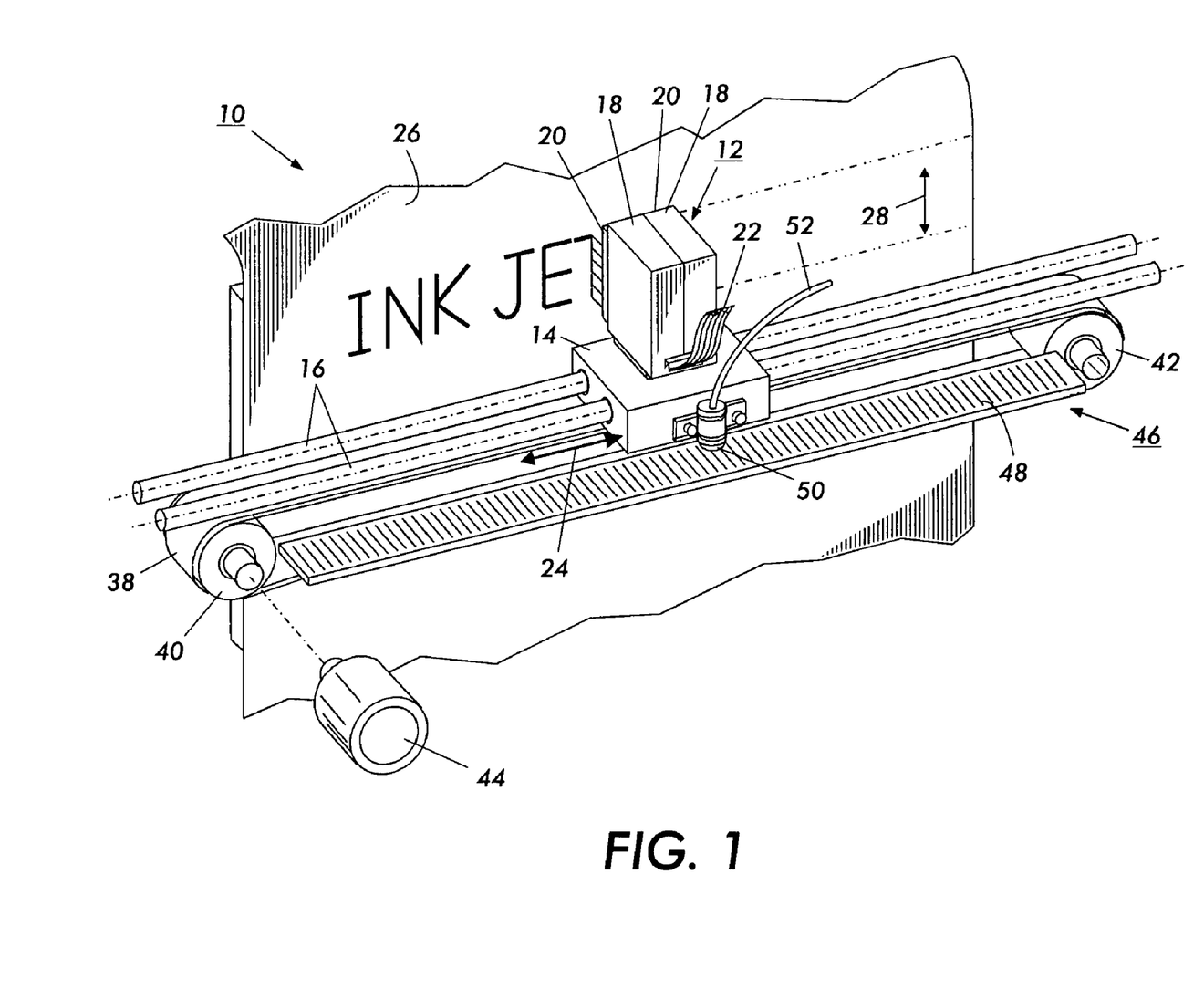
FIG. 1 is a partial schematic perspective view of an ink jet printer incorporating the embodiments described herein.

FIG. 1 illustrates a partial schematic perspective view of an exemplary ink jet printer 10 into which the presently described embodiments may be incorporated. The exemplary printer 10 includes an ink jet printhead system 12 mounted on a carriage 14 supported by carriage rails 16. The printhead system 12 includes a housing, or housings, 18 containing ink for supply to a thermal ink jet printhead, or printheads, 20 which selectively expels droplets of ink under control of electrical signals received from a controller of the printer 10 through an electrical cable or cables such as that shown at, for example, 22. In a color printer, of course, the printhead(s) 20 may comprise a black ink printhead and a color ink printhead. Each printhead(s) 20 contains a plurality of ink channels, which carry ink from the appropriate housing 18 to respective ink ejectors, such as orifices or nozzles. In one form, as will be described below, these orifices or nozzles on any one printhead (e.g. the black ink printhead) may be of various sizes to accommodate the printing of various sizes of drops. Or, multiple printheads 20 (e.g., corresponding to the black ink printhead), each having uniquely sized nozzles, may be implemented. As will become apparent, other combinations and configurations may be implemented.

When printing, the carriage 14 reciprocates or scans back and forth along the carriage rails 16 in the directions of the arrow 24. As the printhead system 12 reciprocates back and forth across a recording medium 26, such as a sheet of paper or transparency, droplets of ink are expelled from selected ones of the printhead nozzles towards the sheet of paper 26. The ink ejecting orifices or nozzles are typically arranged in a linear array perpendicular to the scanning direction 24. During each pass of the carriage 14, the recording medium 26 is held in a stationary position. At the end of each pass, however, the recording medium is stepped by a stepping mechanism under control of the printer controller in the direction of an arrow 28. For a more detailed explanation of the printhead and printing thereby, refer, for example, to U.S. Pat. No. 4,571,599 and U.S. Pat. No. Reissue 32,572, which are incorporated herein by reference.

The carriage 14 is moved back and forth in the scanning directions 24 by a belt 38 attached thereto. The belt 38 is driven by a first rotatable pulley 40 and a second rotatable pulley 42. The first rotatable pulley 40 is, in turn, driven by a reversible motor 44 under control of the controller of the ink jet printer in addition to the toothed belt/pulley system for causing the carriage to move. It is also possible to control the motion of the carriage by using a cable/capstan, lead screw or other mechanisms as known by those skilled in the art.

To control the movement and/or position of the carriage 14 along the carriage rails 16, the printer includes an encoder having an encoder strip 46 which includes a series of fiducial marks in a pattern 48. The pattern 48 is sensed by a sensor 50, such as a photodiode/light source attached to the printhead carriage 14. The sensor 50 includes a cable 52 that transmits electrical signals representing the sensed fiducial marks of the pattern 48 to the printer controller.

Figure 2:
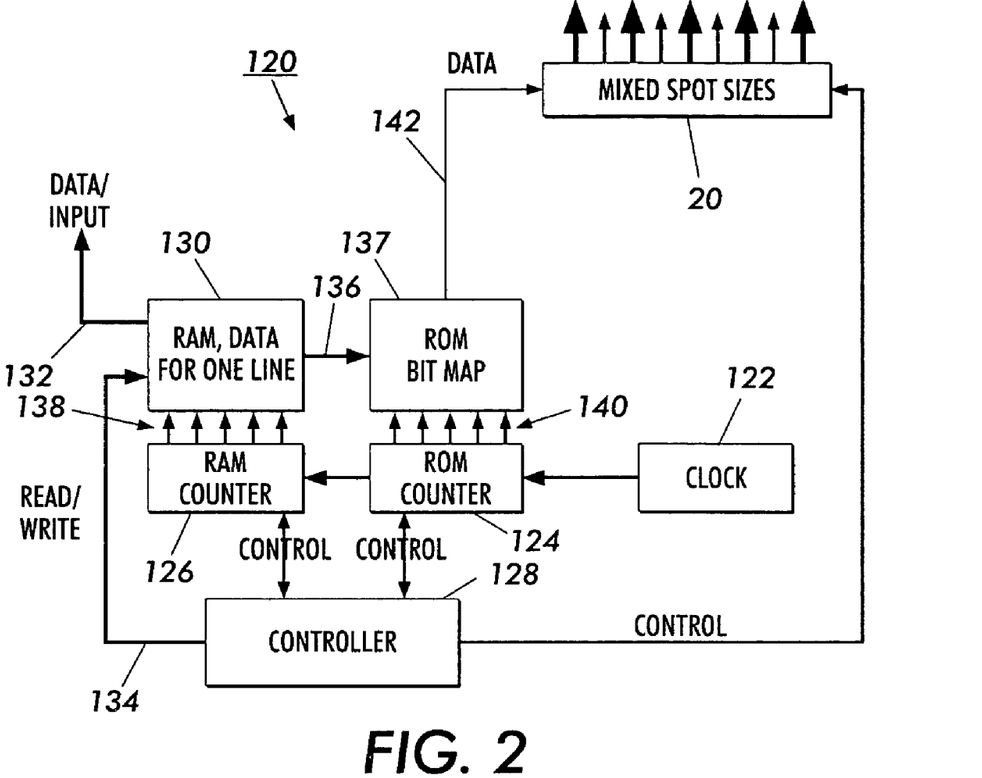
FIG. 2 is a schematic block diagram of a control system.

The printer controller can be a portion of any type of known control system typically used for selectively controlling nozzle function based on image data. An exemplary control system suitable for the present exemplary embodiments is shown in FIG. 2. As seen, the printer controller or control system 120 includes a clock 122 having an output connected to a first counter 124. A second counter 126 is serially connected to the first counter 124. The clock 122 generates a sequence of clock pulses which advances the two counters serially connected together. A printer controller 128 controls the first counter 124 and the second counter 126 through separate control lines.

In addition, the control system 120 includes a RAM 130 having a data/input line 132 and a read/write input line 134 connected to the controller 128. The RAM 130 receives data or input information from a printer interface which is connected to an image generating system such as a personal computer. The RAM 130 stores image information which can include an entire document, a single line thereof, or a single loading of the printhead. An output line 136 of the RAM 130 is connected to a ROM 137 which contains the bitmapped patterns to be printed. The stored bitmapped patterns may take a variety of forms, and may include alphanumeric characters for printing text, or might include a plurality of halftone cells each representing a different gray level. The patterns described below in connection with FIGS. 8(A)-8(D) may be stored in the ROM 137 for selective use.

In operation, the clock 122 generates a sequence of clock pulses which advances the first counter 124 which, in turn, advances the second counter 126. The second counter 126 generates a word over a plurality of output lines 138. The word present on the plurality of output lines 138 is applied to the RAM 130 to select a portion of the image to be printed. Typically, the word appearing on the output lines 138 is an address of the data stored in the RAM. The data stored in the RAM could include a number of from one to N, where N is equal to the number of different gray levels which can be printed.

The first counter 124 includes a plurality of output lines 140 connected to the ROM 137. The counter 124 selected the particular part of the pattern or halftone cell to be loaded into the printhead based on an output 136 of the RAM 130 which is an address for the ROM 137 containing the bitmapped pattern to be printed. Once the first counter 124 selects the particular portion of the bitmap pattern to be loaded, the ROM 137 outputs the necessary data over a first data line 142 connected to a printhead(s) 20. Although the printhead 20 shown prints large and small spots, it should be appreciated that multiple printheads may actually be implemented. In this regard, a black printhead may be implemented along with a color printhead. Of course, either or both such printheads could emit ink from nozzles having varying sizes. In addition, multiple printheads—each having a single but different nozzle size, may be implemented for the black or color printheads, as desired.

Figure 3:
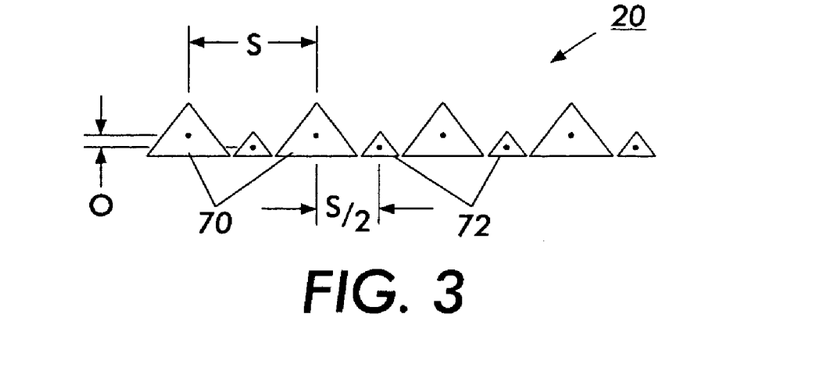
FIG. 3 is a schematic diagram of the alternating size nozzles.

The printhead, or printheads, 20 in one form, though, has different size drop ejectors or nozzles within a single printhead die (e.g., used to print black ink), as shown in FIG. 3. The information output to each printhead(s) 20 is loaded by a shift register (not shown) resident in the printhead. An example of such a shift register and appropriate printhead electronics for use in the present exemplary embodiments is described in U.S. Pat. No. 5,300,968 to Hawkins, herein incorporated by reference. When the loading of the data to the printhead(s) 20 is complete, the information is latched and the individual nozzles eject ink while the next row of data is being loaded into the printhead(s) 20. It is possible to load several rows of data for each output of the RAM 130. In this way, the printer controller 128 is not burdened with the task of generating the specific bitmap for each density level.

FIG. 3 shows an exemplary arrangement of alternating large and small drop ejectors, with large nozzles 70 disposed directly adjacent small nozzles 72 within a single array on printhead 20. In this exemplary arrangement, the primary or large nozzles 70 are spaced apart at their center points a distance S with the small nozzles 72 closely packed therebetween. Thus, the distance between the adjacent nozzle centers is S/2. The centers of adjacent nozzles are offset a distance O. This close packed arrangement, with small nozzles disposed in the space between large nozzles, allows for firing in a single pass. In one form, only the black ink printhead includes an array of this form. However, it should be understood that variations may be implemented. For example, both the black and the color printheads may include different size nozzles. Or, only the color printhead may take such form.

Preferably, for the example of S=1/300 inch, the large nozzles are at least 40 microns, and preferably 50 microns wide at their largest point, and the small nozzles are at least 20 microns, and preferably 25 microns at their largest point, with a channel land width between nozzles of about 5 or 6 microns to achieve adequate sealing. In triangular shaped nozzles as shown in FIG. 3, the width would be measured at the base of the opening. Large nozzles that are 50 microns wide provide complete space filling between spots deposited on the printing substrate with a single spot size at 300 spi (spots per inch), with low ink viscosity and appropriately sized heating resistors. At 300 spi, the spacing S between same size nozzles is about 84.7 microns, with large nozzles at 50 microns and small nozzles at 25 microns fit therebetween. By this, the heater centers and channel centers would be on 600 spi spacing, but in a single printing pass it is possible to use large spots and small spots where desired. This is not possible in some prior art arrangements, in which a standard 600 spi printhead cannot use channels as large as at least 40-50 microns because the channels are on a 42.3 microns centers and require reliable sealing. Thus, to closely pack the different size nozzles, the width of the larger size nozzle is preferably greater than or equal to S/2.

Figure 4A:
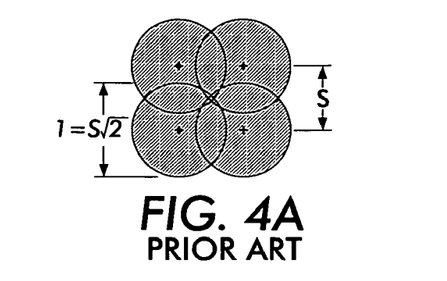
FIG. 4A shows a pattern of drops ejected from a printhead with the same sized nozzles.
Figure 4B:
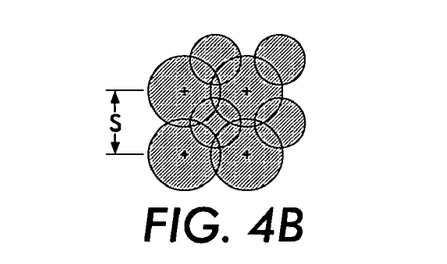
FIG. 4B shows a pattern of drops ejected from a printhead with different sized nozzles.
Figure 4C:
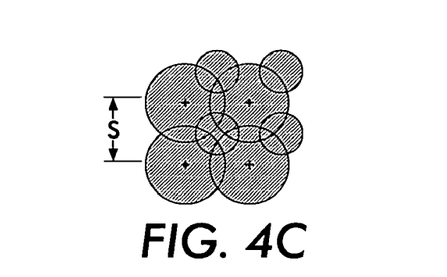
FIG. 4C shows another pattern of drops ejected from a printhead with different sized nozzles.

Typically, in prior art devices that deposit a single spot or drop size, to ensure overlap of diagonally adjacent spots, the spot size D is selected as $S\sqrt{2}$ (i.e., 1.414S) or slightly greater, as seen in FIG. 4A. However, according to the close pack arrangement of the present exemplary embodiments, the spots do not have to be as large as $S\sqrt{2}$ to fill the space. Spot sizes of 1.1S, for the large spots, and 0.8S, for the small spots, as shown in FIG. 4B provide complete filling with additional coverage to allow for misdirected spots. In this case, the area of the small spots is about half the area of the large spots. Other combinations of large and small spots are also possible, such as 1.2S for the large spots and 0.6S for the small spots as shown in FIG. 4C. In this case, the area of the small spots is about one quarter of the area of the large spots. In each of these arrangements, the printed image is superior because the small spots protrude less beyond the edge of the margin of printing. The small spots that do protrude can even be totally or partially eliminated.

Figure 5:
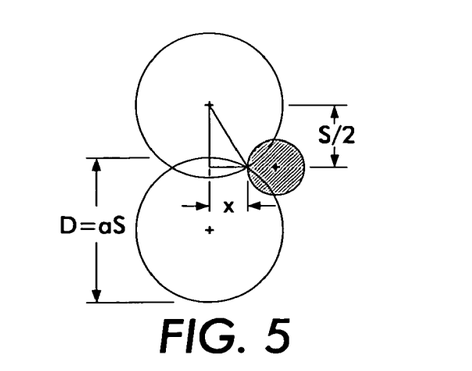
FIG. 5 is a schematic diagram showing the method of determining spacing and overlap between drops.

As shown in FIG. 5, the optimal diameter D of the large spot to completely cover white spaces with minimum overlap can be determined. Using this determination, an efficient balance can be obtained between coverage and ink usage, i.e., the maximum area covered with minimum ink volume. This is an important parameter in ink deposition due to the ink usage limitations imposed by print cartridge capacity and by required ink drying time after printing. Ejection of less ink also allows faster refill of the channel and enables printing speeds in excess of the speed for 300×600 spi printing with a single spot size.

As an example of ink volume savings, referring to FIG. 4A, a grouping of four spots of standard uniform spot size of 1.414S has a total area coverage of $2\pi S^2$. In comparison, FIG. 4B shows a grouping of four spots of diameter 1.1S and four spots of diameter 0.8S. In this case, the total area coverage is $1.85\pi S^2$. In FIG. 4C, which shows a grouping of four spots of diameter 1.2S and four spots of diameter 0.6S, the total area coverage is $1.8\pi S^2$. This represents a significant ink savings when viewed in the context of a page or entire document of print.

The example of FIG. 4A shows the smallest sized spot that will completely cover the paper with no white spaces, if all jets are perfectly directed and all spots have the same size. The examples of FIG. 4B and FIG. 4C allow greater spot overlap than 4A and accordingly allow full coverage even if some spots are slightly small or slightly misdirected. Nevertheless, both examples shown in FIGS. 4B and 4C use less ink than the prior art of FIG. 4A. An even more accurate comparison of the ink savings can be obtained by comparing the two spot size arrangement to a single spot size arrangement by calculating the minimum total area of the two spots, which allows full coverage.

Assuming for purposes of illustration that the diameter of the large spots of FIG. 5 is D=aS (where 1.0<a<2), the point of intersection of the three adjacent spots occurs a distance $x=0.5S(a^2-1)^{0.5}$ from the line joining the two centers. The minimum radius of the smaller spot is thus $r=0.5S(1-(a^2-1)^{0.5})$. For perfect overlap of the large and small spots, if the large spot size diameter is 1.2S, the small spot diameter (2 r) must be at least 0.34S. The area of the four large spots plus the four small spots is Area=$2\pi S^2(a^2-(a^2-1)^{0.5})=1.553\pi S^2$. If the large spot diameter is 1.1S, then the small spot diameter must be at least 0.54S. The total area of this configuration is $1.503\pi S^2$. By differentiating the formula for Area with respect to "a" and setting the result to 0, it is found that the minimum total area is obtained when the large spot diameter is $1.25^{0.5}S=1.12S$, and the small spot diameter is 0.5S. The total area is then $1.5\pi S^2$. This represents an ink savings of 25% relative to the single spot size D=1.414S case in FIG. 4A. In practice, since the layer of deposited ink is thinner for smaller spots, the drop volume savings may be even more than 25%.

Although the above calculation shows the optimal spot size combination for minimal ink usage assuming perfect spot placement and perfectly uniform spot size, in actual printing situations there is variation in both spot placement and spot size. To compensate, it is common practice for prior art printheads having a single spot size to make the spot size a little larger (on the order of 10% larger) than the minimum spot size. For the corresponding optimal spot size combination for minimum ink usage in a two-spot-size printhead for actual printing situations involving misdirection and spot size non-uniformity, the preferred range of spot diameters is greater than or equal to 1.12S−5% and less than or equal to 1.12S+15% for the large spots, and greater than or equal to 0.5S−5% and less than or equal to 0.5S+20% for the small spots. Even here it is understood that a given ink will produce different spot size on different papers and that spot size is a function of temperature in an ink jet printhead.

In order to improve the overall performance in ink jet printing, the presently described embodiments address the problem of intercolor bleed by using, in one form, two different sized drop ejectors for black printing, sized such that full black coverage can be made in a single pass (if desired), with the small drops substantially smaller than the larger drops. A medium dry black ink is also used in at least some embodiments to provide good optical density and less edge raggedness. Large black spots at and near the border between black and color printing are eliminated, in order to suppress intercolor bleed.

Figure 6:
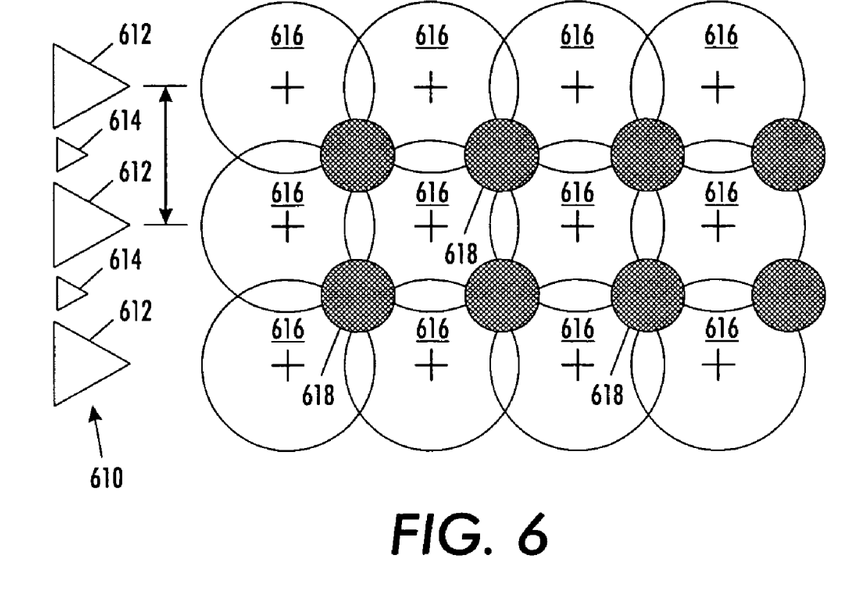
FIG. 6 shows an exemplary printhead array and grid pattern.

In this regard, with reference to FIG. 6, a major grid of large spots 616 offset diagonally by S/2 in both the x and y directions from a minor grid of small spots 618, where S is the grid spacing, is illustrated. One printhead configuration for the printhead system 12 which can generate such a pattern is shown at the left. A linear array 610 of larger nozzles 612 having spacing S is alternated with a linear array of smaller nozzles 614, also at spacing S. This configuration is similar to that shown in FIG. 3. The offset in the scan direction (x) is achieved, for example, by delaying the firing of the smaller nozzles relative to the firing position of the large nozzle. Of course, the linear array 610 is only representatively shown and would, in implementation, be associated with a complete printhead system (not shown). As illustrated, the nozzle 612 and 614 are disposed on the printhead in alternating fashion. However, it should be appreciated that various configurations of the nozzles may well be utilized to implement the present exemplary embodiments. For example, multiple groups of nozzles 612 may be alternated with multiple groups of nozzles 614. As a further alternative, nozzles 612 may be disposed on one printhead while the nozzle 614 are disposed on a separate printhead. The presently described embodiments are not limited to any one of these configurations, provided that the selected configuration has the ability to print large spots of fluid and small spots of fluid in a manner to achieve the objectives of the present exemplary embodiments, such as those shown in FIGS. 8A through 8D below.

It should also be understood that, in one form, the black ink printhead(s) includes this array of different sized nozzles; however, the color ink printhead does not include such an array. Of course, the objectives of the presently described embodiments could also be achieved if both the black ink printhead(s) and color ink printhead(s) included nozzle arrays of different sized nozzles.

Likewise, one may implement the teachings of the presently described embodiments to use a black ink printhead having a single size nozzle array and a color ink printhead having a nozzle array of different sized nozzles. In this regard, it is important to have fast throughput in black printing, but less important to have fast throughput in color printing. Color printing is typically done in multiple passes. So, the color drop ejectors may be of two sizes, similar to those described for black (although the actual channel, heater, and orifice dimensions may be smaller because the fast dry color ink will tend to spread more than the medium dry black ink).

To provide the somewhat larger drop volume, the larger drop ejectors typically take up more space on the printhead than the smaller drop ejectors, both at the nozzle and in the lateral dimensions of the ink channel. The height of the ink channel may be different if the channels are made by techniques such as orientation dependent etching. The height of the ink channel will be the same for the two sized drop ejector if the walls are made by polyimide, unless the floor of the channel on the heater plate is locally raised for the smaller drop ejectors by a thicker layer of polyimide. Actual channel and nozzle geometries would need to be tailored for the particular ink being used, as well as the particular drop volumes chosen. However, for the case where the large drop ejector produces a spot Whose area is about 4 to 5 times that of the small drop ejector, within the S=84.7 micron distance for a major grid spacing of 300 spi, and channel walls of 7 to 8 microns, the large channel width could be approximately 50 microns and the small channel width could be approximately 20 microns. The orifice at which the droplet is ejected could provide further differentiation in drop volume, for example, by necking down polyimide channel walls, or providing different orifice sizes in a laser ablated nozzle plate. Similarly, the heater length and width would be made larger for the larger drop ejector. To provide the larger current required by the larger heater, it is also expected that the driver transistors for the larger drop ejector would also take up a larger proportion of the space on the heater die.

With respect to the ink used, in one example, the black ink is a medium dry (drying in seconds to tens of seconds) while the color inks are fast dry (drying in less than one second). The presently described embodiments do not require that the black and color inks contain components which chemically induce one another to precipitate or crash.

According to the presently described embodiments, a method of suppressing intercolor bleed at the boundary between black and color printing is realized. This is accomplished by primarily using small black spots near the color boundaries (e.g., eliminate all or substantially all of the large black spots near a color boundary). The objective is to suppress intercolor bleed without leaving a white border at the boundaries. If desired, the small black spots (which are actually a little smaller in the example described than would be used for 600 spi printing) can be kept on 300 spi centers, or can be printed on 600 spi centers using double the jetting frequency and multiple pass printing. It is also possible to eliminate some of the color pixels near the boundary. If two sizes of color spots are used (similar to black), substantially all of the larger color pixels would be eliminated at or near the boundary. Even if only small color spots are used, it may be advantageous to eliminate some of the small color spots.

Figure 7:
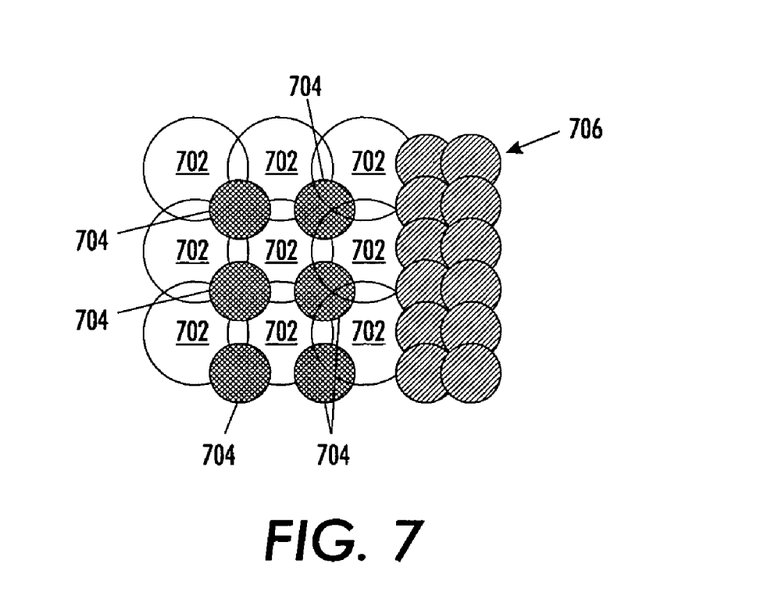
FIG. 7 illustrates an exemplary drop pattern.

FIG. 7 shows a typical result of the printhead system 12 where techniques contemplated herein were used without removing any drops or spots from the edge or border region between black and color. The large black drops 702 (unfilled large circles), the small black drops 704 (small gray or double cross-hatched circles, for ease of explanation) and small drops of a different color 706 (shown as single cross-hatched circles) are shown in a configuration (e.g., a first configuration) to be printed. In this case, there will likely be intercolor bleed, because the two types of ink overlap.

FIGS. 8A-8D below show examples of intercolor bleed suppression by the method of the presently described embodiments in which selected large drops or spots of ink are deleted at the boundary, and the smaller pixels are used either at 300 spi or 600 spi at the boundary. This is accomplished by modifying the first configuration to obtain a second configuration of drops. In addition, the color pixel pattern at the boundary may also be modified, such as in FIG. 8D.

Figure 8A:
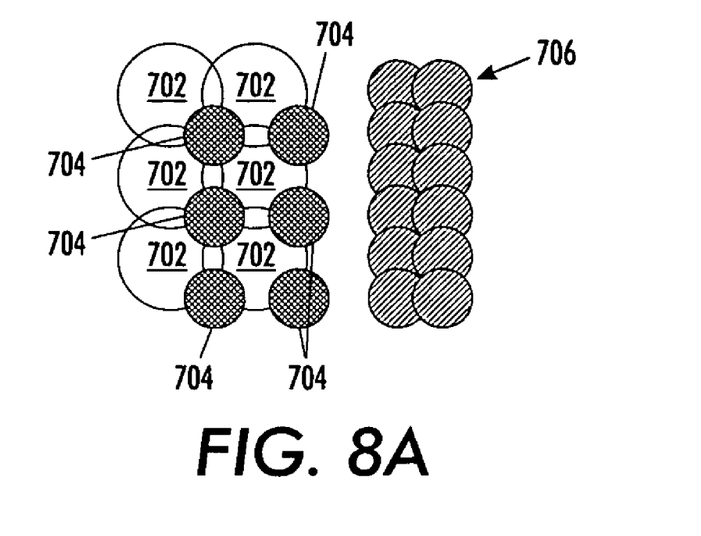
FIG. 8A-8D illustrate exemplary drop patterns printed according to the presently described embodiments; and, FIG. 9 illustrates a method according to the presently described embodiments.

More particularly, with reference to FIG. 8A, a row of large black spots 702 are eliminated within the edge or border region. As shown, large black spots 702 are removed in the region between the color spots 706 and the nearest smaller black spots 704.

Figure 8B:
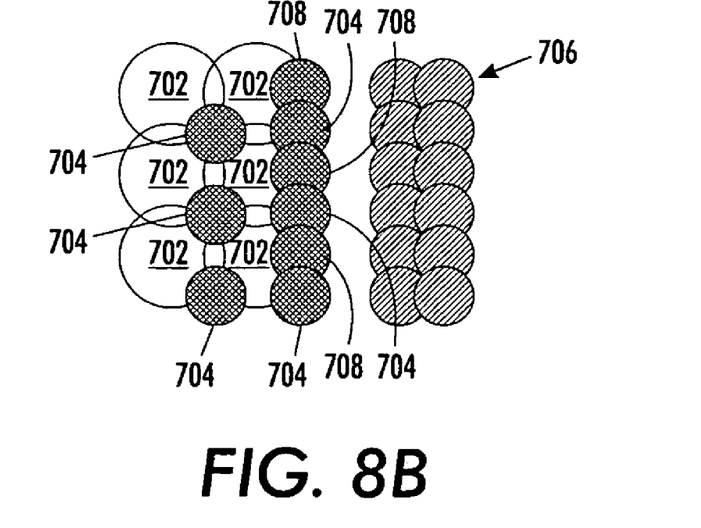

With reference to FIG. 8B, the technique according to FIG. 8A is used. However, a second pass of the printhead(s) 20 is used to better fill the edge region with smaller black spots 708 (shown as gray or double cross-hatched circles). In this regard, the smaller black spots 708 are generated by the smaller nozzles of the printhead system, e.g., nozzles 614, and offset from the original printing of the small spots 704.

Figure 8C:
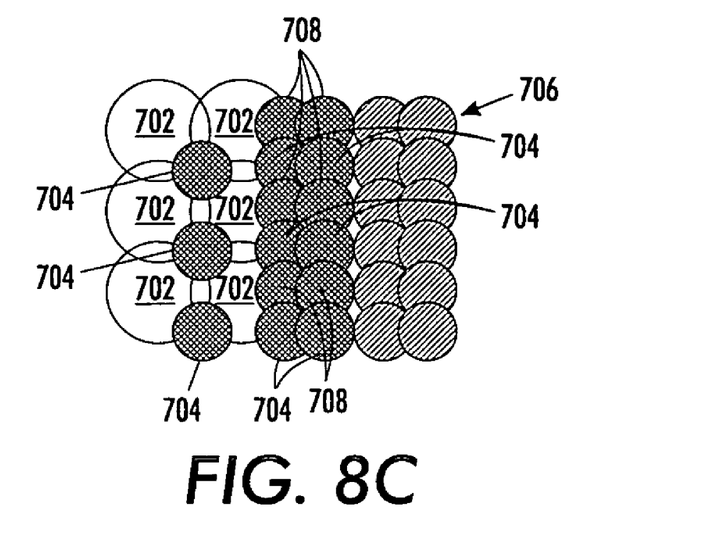

Similarly, with reference now to FIG. 8C, the technique of removing large black spots 702 can be further modified by doubling the frequency of smaller black spots 704 and also doubling the frequency of the black spots 708 that are printed in the second pass. This, of course, will increase the amount of ink at the edge region but still avoid intercolor bleed.

Figure 8D:
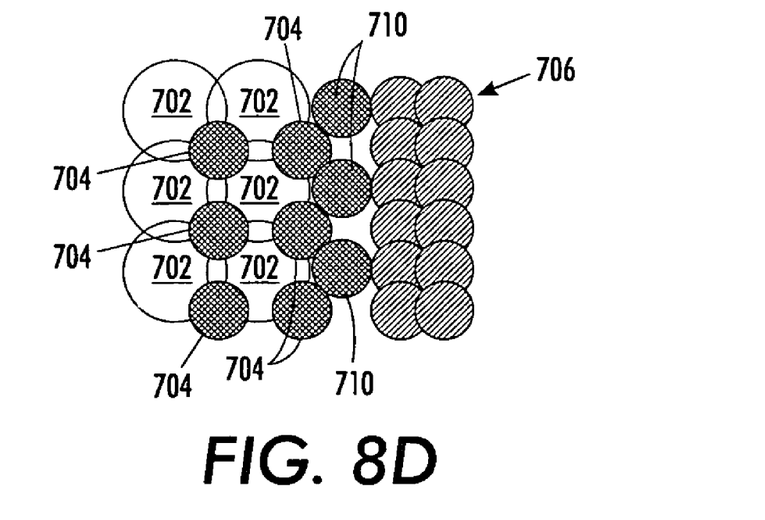

With reference now to FIG. 8D, a still further variation of the presently described embodiments is illustrated. As shown, a double pass of the printhead may be used to print additional black spots 710 (shown as gray or double cross-hatched circles) that are offset from the first pass smaller black spots 704 in both the x and y directions. In addition, some color spots 706 may likewise be removed in such manner so that no overlap between the small drops of ink occurs.

Figure 9:
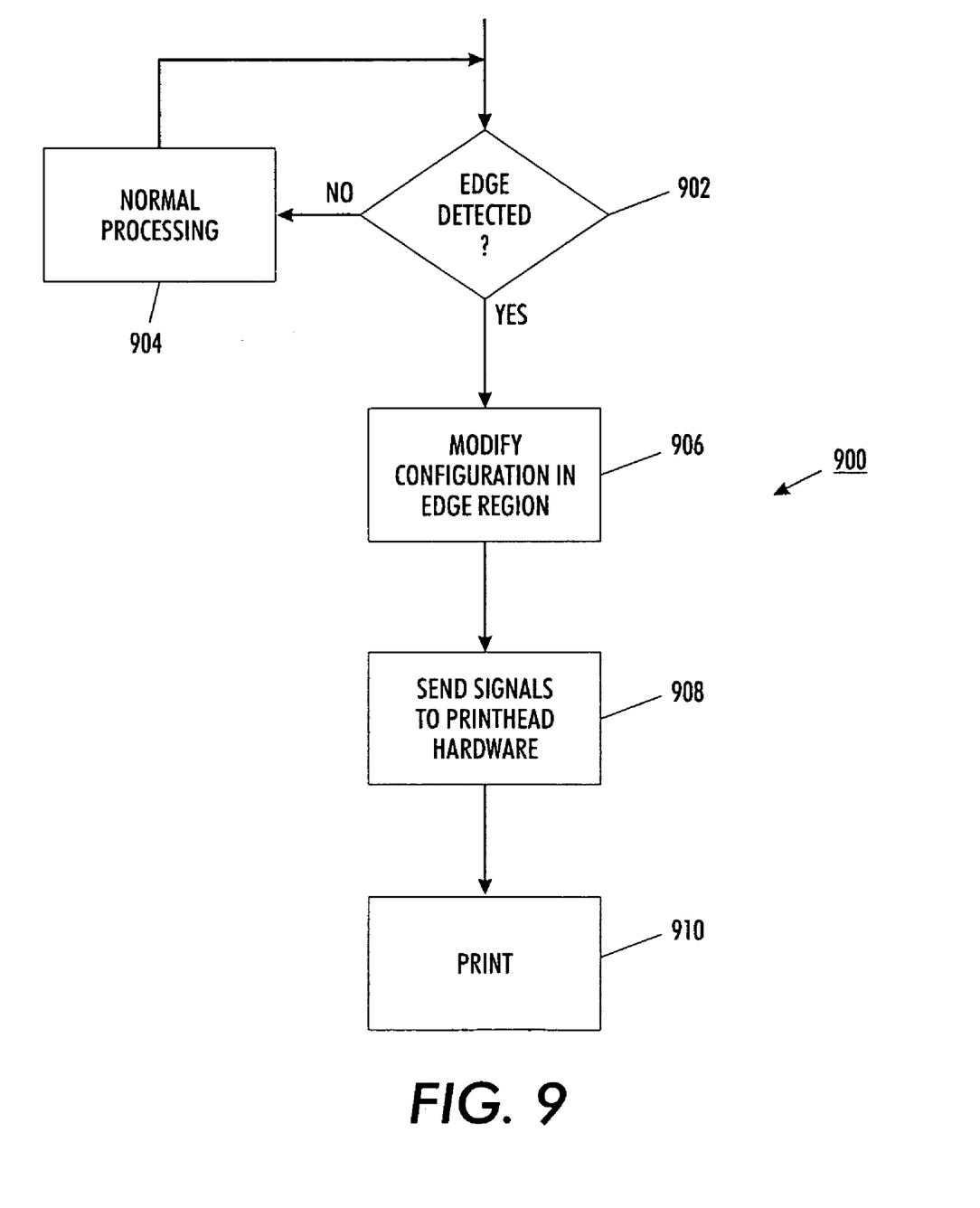

FIG. 9 illustrates a method according to the presently described embodiments. This method is implemented in the present system in the form of software that controls the controller 128 (FIG. 2). Of course, such software may take a variety of forms and, in implementation, may also utilize a variety of hardware elements within the printer, some of which are shown in FIG. 2. In addition, any such software may be centralized in the controller or may be distributed within the system. For example, portions of the software method described may be housed within the image processor of the system.

As shown, the method 900 includes a process for detecting edges within the image being printed (at 902). It should be understood that the image may take a variety of forms, depending on the precise point in the processing of the image. For example, the image may be a bit-mapped (or half-toned) image or may be a contone or an 8 bit-per-pixel image. The edge between a black portion and a color portion of the image is disposed within a region (e.g., an edge or border region) of color pixels and black pixels. This region also corresponds to a configuration (e.g., a first configuration) of drops to be ejected to print the image. Techniques for edge detection in image processing are well known. For example, a variety of edge detection algorithms are available to determine black edges near color portions of the image. Alternatively, if page description language (PDL) is used, it will be apparent that text is to be printed on a colored region. Examples of known edge detection techniques are found in U.S. Pat. No. 6,270,186, entitled "Reduction of Inter-Color Bleeding in Liquid Ink Printing", U.S. Pat. No. 6,183,062, entitled "Maintaining Black Edge Quality in Liquid Ink Printing", and U.S. Pat. No. 6,290,330, entitled "Maintaining Black Edge Quality in Liquid Ink Printing", all of which are incorporated herein by reference.

If no edges are detected, the normal processing and printing of the image occurs (at 904). If, however, an edge is detected, the pixels within the edge region are modified (at 906). In the case where the image or region to be modified is a bit-mapped (or half-toned) image, the first configuration of drops to be printed is modified to obtain a second configuration of drops to be printed in which at least some of the larger sized drops are removed from the edge region. In this regard, parameters are predefined within the control structure (e.g., controller 128) based on the border region. For example, parameters are defined based on the number of pixels within the border region, the drop size to be printed within the border region, print quality, print speed, type of paper, and the actual locations of the drops. A predetermined and stored drop pattern may also be used in this regard. The drop patterns of FIGS. 8A-8D may serve as the second configuration. These patterns may be stored in the ROM bit map 137 (FIG. 2), or at another suitable location.

In the case where the image or region is a contone or an 8 bit-per-pixel image, the image may be filtered so that the edge pixels are given values low enough to be printed with small dots (using smaller nozzles). Of course, the modification would also include the selective removal of larger dots, as described above in connection with FIGS. 8(A)

through 8(D). In some cases, this may require filtering of pixels corresponding to larger drops such that the values of the pixels are provided so as to prevent the printing of a drop. In other cases, the modification may not require the removal of larger drop pixels but simply require the management of the edge region to allow for printing of only smaller drops therein. The patterns may also be stored and serve as the second configuration, or parameters (as above) may be used. The modified image can then be half-toned and processed.

Once the pixel pattern within the border region or edge region is modified, appropriate signals, corresponding to a drop pattern of the second configuration, are sent to, or simply used by, the printhead hardware (at 908). The image is then printed based on these signals (at 910). As noted above, the printing is accomplished, in one form, by using a printhead system having nozzles of varying sizes.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for reducing intercolor bleed in an ink jet printing process implementing a first and second configuration of drops, said first configuration including relatively large drops and said second configuration including a combination of relatively large drops and relatively small drops, the method comprising:
    detecting an edge between a black portion and a color portion of an image to be printed, the edge being disposed within a region of color pixels and black pixels to be printed in a first configuration of drops;
    modifying the first configuration of drops to be printed within the region including removing at least some of selected relatively large drops in order to obtain a second configuration of drops to be printed within the region wherein the second configuration of drops to be printed includes the combination of relatively large drops and relatively small drops; and,
    printing the image by ejecting the drops from a printhead based on the second configuration, the printhead having nozzles operative to eject the drops, the nozzles being of sizes corresponding to the relatively large drops and the relatively small drops.

2. The method as set forth in claim 1 wherein the modifying comprises a first pass and a second pass of the printhead allowing for the printing of the image where the first pass is offset from the second pass.

3. The method as set forth in claim 2 wherein the modifying includes removing at least some of selected relatively large drops in such a manner where no overlap occurs in the relatively small drops.

4. The method as set forth in claim 1 wherein the modifying comprises increasing the frequency of other selected drops to be printed in the region.

5. The method as set forth in claim 4 wherein the other selected drops are relatively small drops.

6. The method as set forth in claim 1 wherein the modifying is based on a predetermined pattern.

7. The method as set forth in claim 1 wherein the modifying is based on at least one of a number of pixels in the region, drop size, print quality, print speed, paper quality and drop location.

8. An apparatus for reducing intercolor bleed in an ink jet printing process, the apparatus comprising:
    means for detecting an edge between a black portion and a color portion of an image to be printed, the edge being disposed within a region of color pixels and black pixels to be printed in a first configuration of drops;
    means for modifying the first configuration of drops to be printed within the region including removing at least some relatively large drops in order to obtain a second configuration of drops to be printed within the region wherein the second configuration of drops to be printed includes relatively large drops and relatively small drops; and,
    means for printing the image based on the second configuration.

9. The apparatus as set forth in claim 8 wherein the second configuration further comprises an increase frequency of other selected drops.

10. The apparatus as set forth in claim 8 wherein the drops to be printed include relatively large drops and relatively small drops.

11. The apparatus as set forth in claim 10 wherein the other selected drops are relatively small drops.

12. The apparatus as set forth in claim 8 wherein the means for modifying comprises a predetermined pattern.

13. The apparatus as set forth in claim 8 wherein the means for modifying is based on at least one of a number of pixels in the region, drop size, print quality, print speed, paper quality and drop location.

14. The apparatus as set forth in claim 8 wherein the means for printing comprises nozzles having sizes corresponding to the relatively large drops and the relatively small drops.

15. A system for reducing intercolor bleed in an ink jet printing process, the system comprising:
    a controller operative to detect an edge between a black portion and a color portion of an image to be printed, the edge being disposed within a region of color pixels and black pixels to be printed in a first configuration of drops and to modify the first configuration of drops to be printed within the region by removing at least some relatively large drops to obtain a second configuration of drops to be printed within the region wherein the second configuration of drops to be printed includes the relatively large drops and relatively small drops; and,
    at least one printhead having nozzles operative to eject the drops, the nozzles being of sizes corresponding to the relatively large drops and the relatively small drops.

16. The system as set forth in claim 15 wherein the controller is operative to modify based on a predetermined pattern.

* * * * *